(12) United States Patent
Solomon et al.

(10) Patent No.: US 8,661,173 B2
(45) Date of Patent: Feb. 25, 2014

(54) USB DATA STRIPING

(75) Inventors: Gary Solomon, Acton, MA (US); Joe Schaefer, Beaverton, OR (US); Robert A. Dunstan, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 759 days.

(21) Appl. No.: 12/058,870

(22) Filed: Mar. 31, 2008

(65) Prior Publication Data

US 2009/0248978 A1 Oct. 1, 2009

(51) Int. Cl.
*H04J 3/00* (2006.01)

(52) U.S. Cl.
USPC ............... 710/104; 710/17; 710/63; 710/71; 710/105; 370/464; 370/474

(58) Field of Classification Search
None
See application file for complete search history.

(56) References Cited

U.S. PATENT DOCUMENTS

| | | | | |
|---|---|---|---|---|
| 5,379,297 A * | 1/1995 | Glover et al. | ........... | 370/234 |
| 5,781,549 A * | 7/1998 | Dai | ........... | 370/398 |
| 6,801,971 B1 * | 10/2004 | Devine et al. | ........... | 710/107 |
| 6,829,248 B1 * | 12/2004 | Metzger et al. | ........... | 370/466 |
| 7,209,470 B2 * | 4/2007 | McGowan | ........... | 370/349 |
| 7,570,654 B2 * | 8/2009 | Muthukrishnan et al. | ........... | 370/428 |
| 7,623,455 B2 * | 11/2009 | Hilla et al. | ........... | 370/232 |
| 7,657,692 B2 * | 2/2010 | Lee et al. | ........... | 710/315 |
| 7,940,661 B2 * | 5/2011 | Ervin et al. | ........... | 370/232 |
| 8,009,696 B2 * | 8/2011 | Williams et al. | ........... | 370/473 |
| 2002/0105949 A1 * | 8/2002 | Shinomiya | ........... | 370/386 |
| 2002/0176430 A1 * | 11/2002 | Sangha et al. | ........... | 370/412 |
| 2002/0176450 A1 * | 11/2002 | Kong et al. | ........... | 370/539 |
| 2004/0100958 A1 * | 5/2004 | Peng | ........... | 370/392 |
| 2005/0076115 A1 * | 4/2005 | Andrews et al. | ........... | 709/224 |
| 2006/0153196 A1 * | 7/2006 | Diaz et al. | ........... | 370/395.1 |
| 2007/0025252 A1 * | 2/2007 | McGee et al. | ........... | 370/235 |
| 2008/0065796 A1 * | 3/2008 | Lee et al. | ........... | 710/71 |
| 2008/0155160 A1 * | 6/2008 | McDaniel | ........... | 710/306 |
| 2008/0298236 A1 * | 12/2008 | Ervin et al. | ........... | 370/232 |
| 2009/0003335 A1 * | 1/2009 | Biran et al. | ........... | 370/389 |
| 2009/0067324 A1 * | 3/2009 | Licardie et al. | ........... | 370/225 |

(Continued)

FOREIGN PATENT DOCUMENTS

| | | | |
|---|---|---|---|
| CN | 201374424 Y | * | 12/2009 |
| JP | 2006065859 A | * | 3/2006 |

OTHER PUBLICATIONS

'Universal Serial Bus 3.0 Specification' Revision 1.0, Nov. 12, 2008 (full copy can be found at http://www.gaw.ru/pdf/interface/usb/USB%203%200_english.pdf).*

(Continued)

*Primary Examiner* — Steven Snyder

(74) *Attorney, Agent, or Firm* — Buckley, Maschoff & Talwalkar LLC

(57) ABSTRACT

A striping system and method for distributing a payload of data across a plurality of parallel USB cables from a source to a destination is described. The striping devices reside in the architecture of a source and destination connected by more than one standardized USB bus cable. The striping devices increase the bandwidth between the source and the destination by providing more lanes of data traffic and utilizing segmentation and reassembly to ensure that the data is split up and then reassembled correctly into the original stream at the destination. The striping devices allow for user determination of usability along with self diagnostics as to the source's and destination's ability to handle striping. Other embodiments are described.

15 Claims, 5 Drawing Sheets

(56) References Cited

U.S. PATENT DOCUMENTS

2009/0088024 A1* 4/2009 Ling et al. .................. 439/607
2009/0248924 A1* 10/2009 Melin .......................... 710/63
2009/0327536 A1* 12/2009 Solomon et al. ............. 710/63

OTHER PUBLICATIONS

'Logical Link Control and Adaptation Protocol' by Palo Wireless (from archive of www.palowireless.com posted on Mar. 12, 2007).*
'PHY Interface for the PCI Express and USB 3.0 Architectures' Version 3.0, Intel Corporation, copyright 2007-2009.*
'Overview of Sun Trunking 1.3 Software' Copyright © 2007, Sun Microsystems, Inc.*
'Universal Serial Bus Specification' Revision 2.0, Apr. 27, 2000, pp. 13, 19, 20, 29, 30, 197, 241-245.*
'PCI Express Base Specification Revision 1.0a' copyright 2002, 2003 PCI-SIG.*
'Creating a Third Generation I/O Interconnect' by Ajay V. Bhatt, Intel Developer Network for PCI Express Architecture, Nov. 5, 2003.*
'Creating a PCI Express Interconnect' White Paper by Ajay V. Bhatt, copyright 2002.*

* cited by examiner

USB DATA STRIPING

FIELD

The present application relates, in general, to USB Data Transfers. In particular, the present invention speeds data transfers in platforms where a source and destination are connected by more than one USB cable by sharing the load across multiple USB cables.

BACKGROUND

Universal Serial Bus ("USB") is a standard developed to allow plug and play or hot swapping connectivity and to replace all legacy serial and parallel ports between a host (source/destination) and a connected device (destination/source). Because USB provides a low cost mechanism for transferring data between locations the standard has become ubiquitous and widely used by system administrators and networked platforms. One of the drawbacks to this universally available USB standard when data transfers are required at high levels is that it has limited bandwidth and throughput between the source and the destination. What is needed is a way to utilize multiple and ubiquitous USB cables and corresponding USB enabled devices to increase throughput and bandwidth.

BRIEF DESCRIPTION OF THE DRAWINGS

The following description can be better understood in light of Figures, in which.

Figure 1:
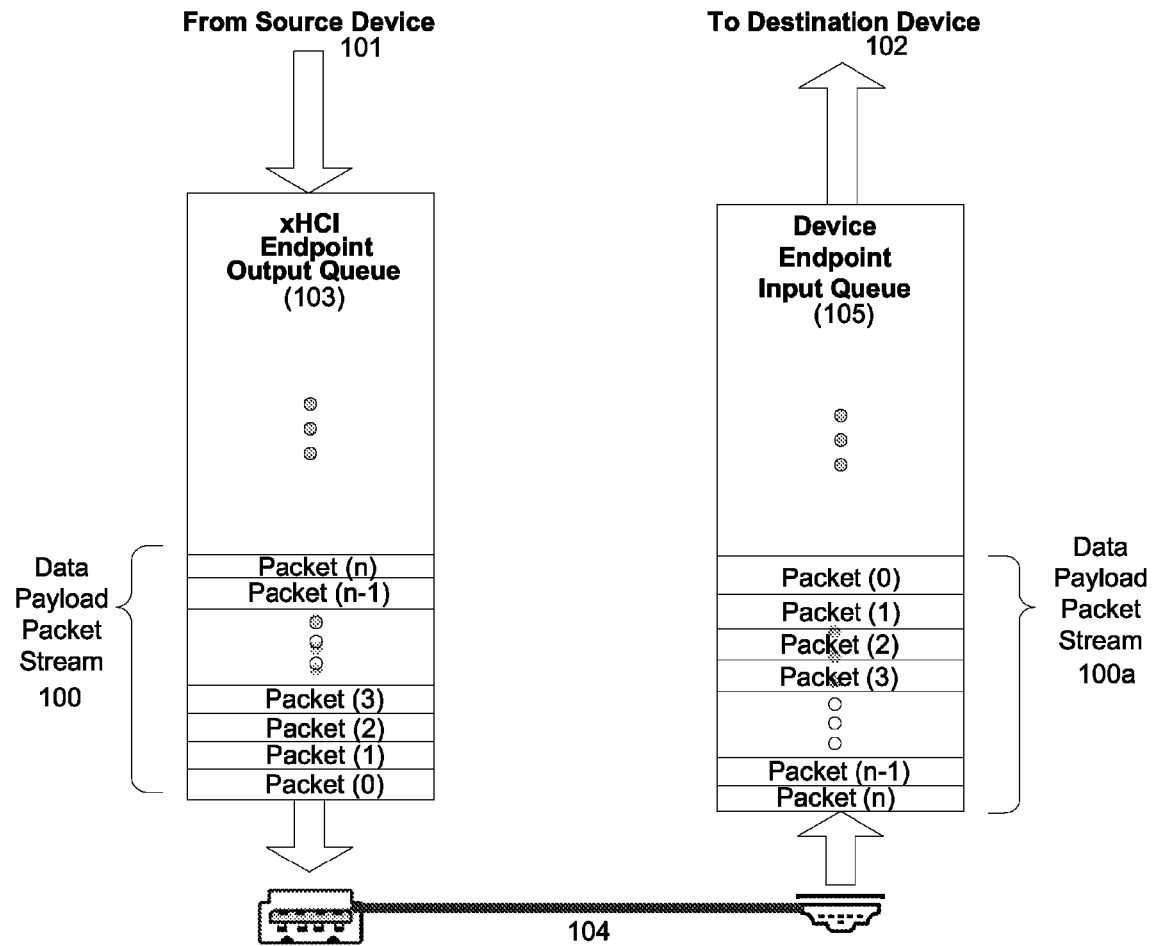
FIG. 1 illustrates how two devices may communicate through a USB cable.

Together with the following description, the Figures demonstrate and explain the principles of USB striping and associated methods for using and implementing the USB striping. In the Figures, the thickness and configuration of components may be exaggerated for clarity. The same reference numerals in different Figures represent the same element.

DETAILED DESCRIPTION

The following description supplies specific details in order to provide a thorough understanding. Nevertheless, the skilled artisan would understand that the devices and associated methods of using the devices can be implemented and used without employing these specific details. Indeed, the devices and associated methods can be placed into practice by modifying the illustrated devices and can be used in conjunction with any devices and techniques conventionally used in the industry. For example, while the description below focuses on USB enabled devices, the invention may be implemented to provide platform scalability in many other applications and end uses, such as fire-wire enabled devices.

The USB data striping method provides a scalable option for platform administrators and operators to increase bandwidth and reduce power and heat concerns. Typically, but not exclusively, the striping method described herein would be used to provide increased bandwidth in platform environments using ubiquitously available USB cables. Any platform that operates in this manner can be used, however, including the platforms described and illustrated below.

FIG. 1 illustrates an industry standard USB implementation. Packets of data 100 are transferred from a host controller or source 101 to an end point or destination 102. Packets are a collection of bytes that are split into three parts: a header, a payload and a trailer. The header contains instructions about the data carried in the packet. These instructions may include: Length of packet, synchronization, packet number, protocol, destination address, and originating address as examples. The payload, also called the body or data of a packet, is the actual data that the packet is delivering to the destination. If a packet is fixed-length, then the payload may be padded with blank information to make it a standard size. The trailer, sometimes referred to as the footer, typically contains a couple of bits that tell the receiving device that it has reached the end of the packet. It may also have some time of error checking. The most common type of error checking is cyclic redundancy check ("CRC").

Items are queued in an output queue 103 where they are prepared for serial transmission using a standard USB cable 104. The standard USB cable consists of four lines allowing for Power, Ground, and the data represented as both positive and negative to be transferred. With each improved USB standard, the USB cable is able to transfer data at higher speeds, be longer in length and withstand more connect/disconnect cycles. As an example, the current USB 2.0 standard allows 480 Megabits per seconds for cables to come in 5 foot lengths and last through 10,000 connect/disconnect cycles. This compares with 12 Megabits/second for the previous generation of USB and an anticipated 5 Gigabit/second in the next generation. With increased lengths and speeds, USB standards will become more ubiquitous in networked and platform environments, further increasing the need for increased bandwidth as the USB standard becomes even more universal in use and presence. For purposes of this disclosure, the preferred embodiments are anticipated to be released with the next generation of USB standardized cables, usually referred to as USB 3.0. For simplicity, the phrase "USB" shall refer to all USB standards, including USB 3.0. The packets of data 100 are funneled through the USB cable to the destination's input queue 105. This movement from the output queue 103 to the input queue 105 is sometimes referred to as a USB pipe.

Figure 2:
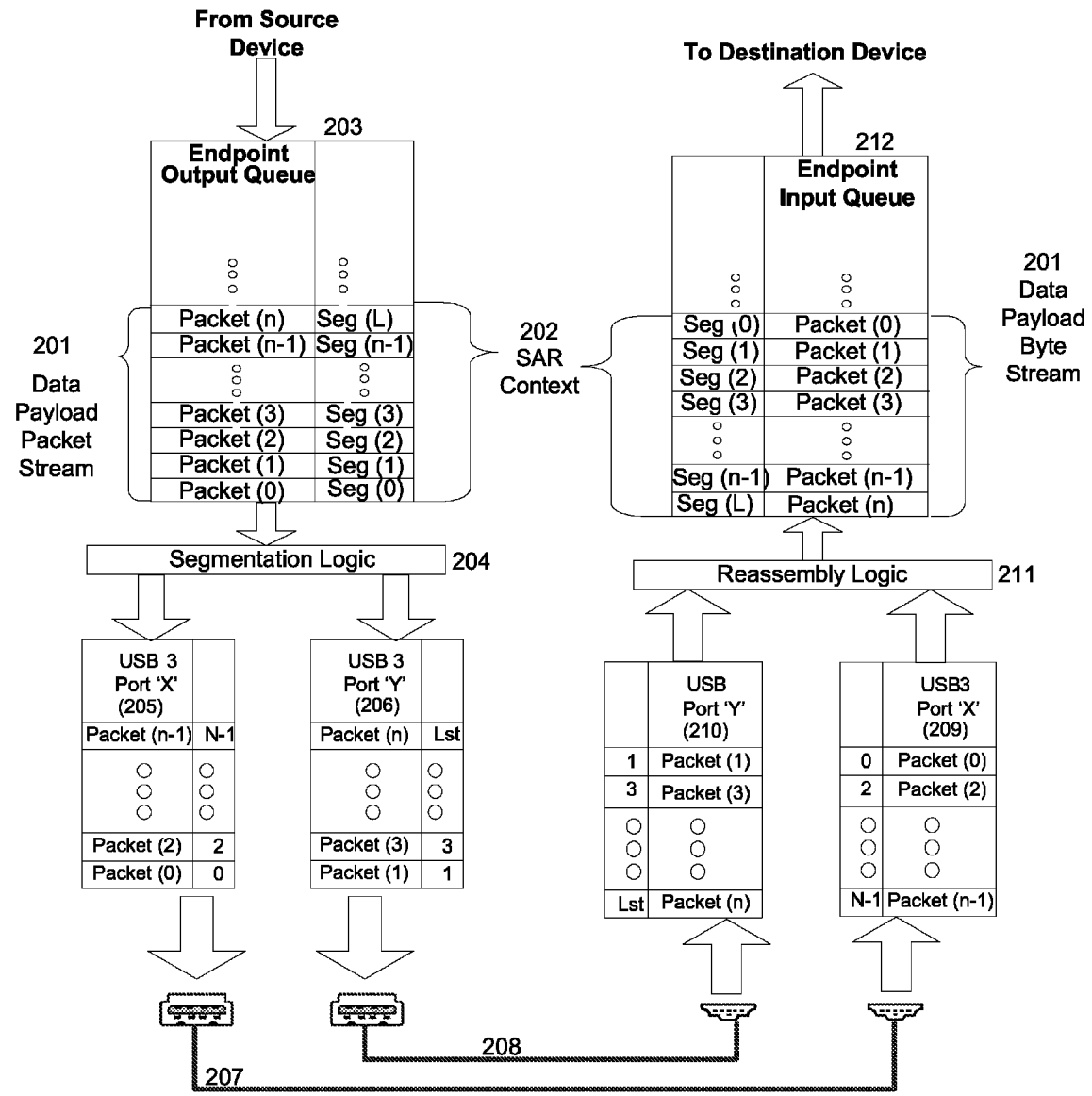
FIG. 2 depicts some embodiments of a USB striping across two striping enabled devices connected with two USB cables.

FIG. 2 illustrates USB striping when two USB cable buses are present. Data striping could be available to consumers in the next generation of USB with the hardware built to accommodate segmentation and reassembly requirements and basic input/output system ("BIOS") or other software modifications to allow striping to be configured by an end user. By striping the data into multiple lanes of USB buses, typical data transfers will complete in short high speed bursts allowing the USB to rest more often in lower power consumption states, ultimately reducing heat and power requirements. As known in the art, this technique is commonly referred to as a race to halt technique.

As there is no guarantee that data from one port will arrive faster than data sent from another port, each packet 201 is associated with a segmentation and reassembly key 202 when placed in the host device's output queue 203. Segmentation and Reassembly ("SAR") refers to the process used to fragment and reassemble packets so as to allow them to be transported out of order. A SAR key (tag) is provided in the header with each packet, where its value increases contiguously with each successive packet payload from the original data buffer to be transmitted. A given packet's SAR key enables logic on the destination to piece the receive buffer data back together (reassembly) in its original byte order independent of receive order for each of the packet payloads arriving at the destination.

An incoming packet from the host to be transmitted across the USB bus is chopped up into segments that fit the USB standardized payloads. At the far end, these chunks are fitted back together to reconstitute the original data payload from all of the packet payloads received.

The process is analogous to the fragmentation of Internet Protocol ("IP") packets on reaching an interface with a Maximum Transmit Unit ("MTU") size less than the packet size and the subsequent reassembly of the original packet once the fragments have reached the original packet's destination.

Since different types of data are encapsulated in different ways, the details of the segmentation process vary according to the type of data being handled. There are several different schemes, referred to as ATM Adaptation Layers (AAL). The schemes are: AAL0—Raw cells with no special format; AAL1—Constant bit-rate, circuit emulation (T1, E1, et); AAL2—Variable bit-rate synchronous traffic, e.g. voice data; AAL3/4—Variable bit-rate asynchronous traffic, e.g. Frame Relay transport; and AAL5—Used for most data traffic, such as IP.

In the striping enabled system of FIG. 2, the payload to be transferred is passed through segmentation logic 204 that separates the payload by alternating the packets across two USB ports 205 and 206, here labeled, respectively, as port "X" and port "Y". The segmentation logic simply separates the payload by sending even numbered packets through port X 205 and it's corresponding USB bus cable 207 and by sending odd numbered packets through port Y 206 and it's corresponding USB bus cable 208. Other segmentation schemes may be used where appropriate. Indeed, there may be times when separating a packet into byte sized units or sending multiple packets together may prove more desirable than the interleaving method described.

Once the odd and even packets are received at the destination's corresponding X 209 and Y 210 ports, they are reassembled by passing the data through some reassembly logic 211 according to the segmentation and reassembly key and scheme employed and the data is piped into the destination's input queue 212 to be stored or utilized as previously determined.

Figure 3A:
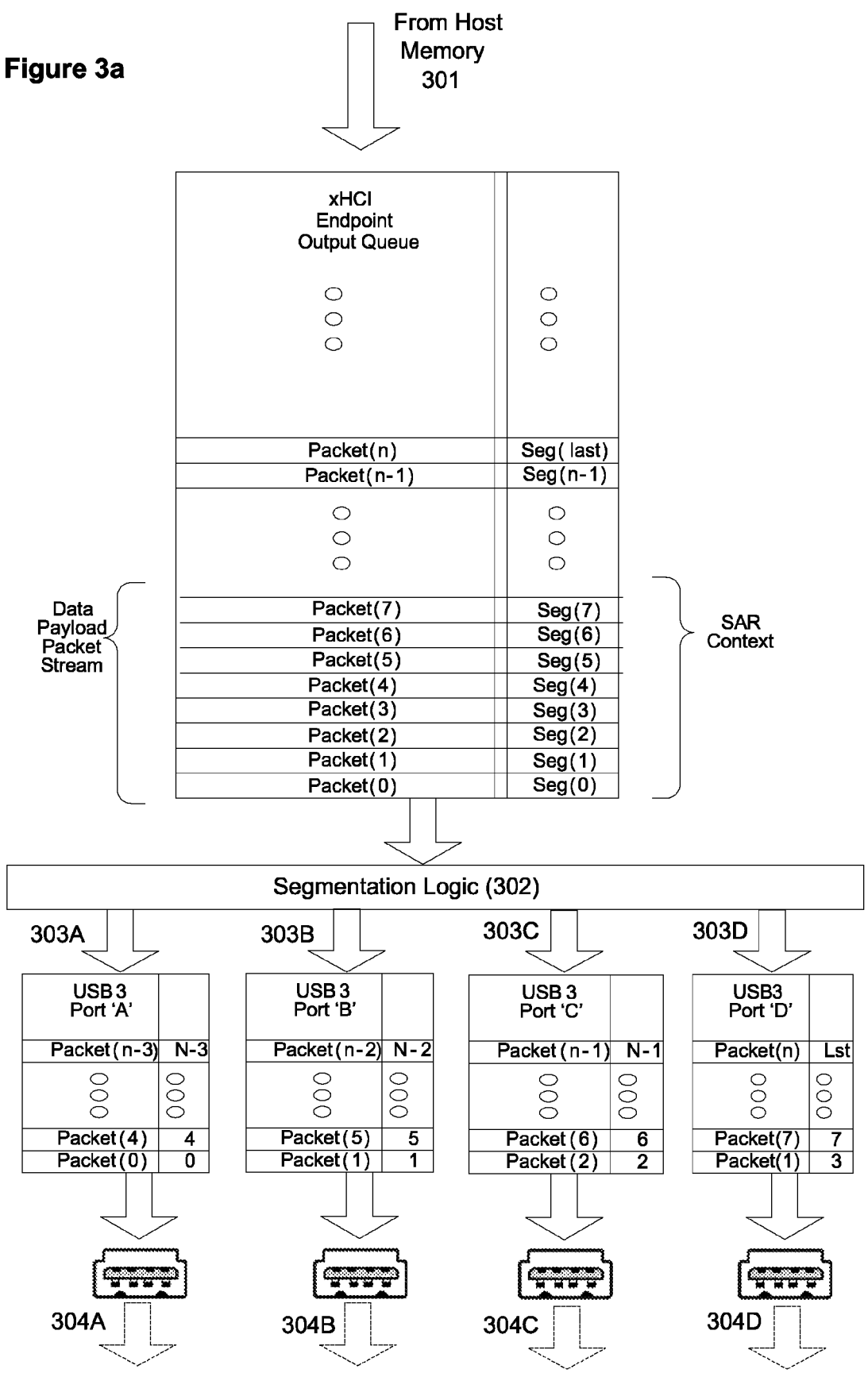
FIGS. 3*a* and 3*b* illustrates some embodiments of how striping occurs between four striping enabled USB link partners.
Figure 3B:
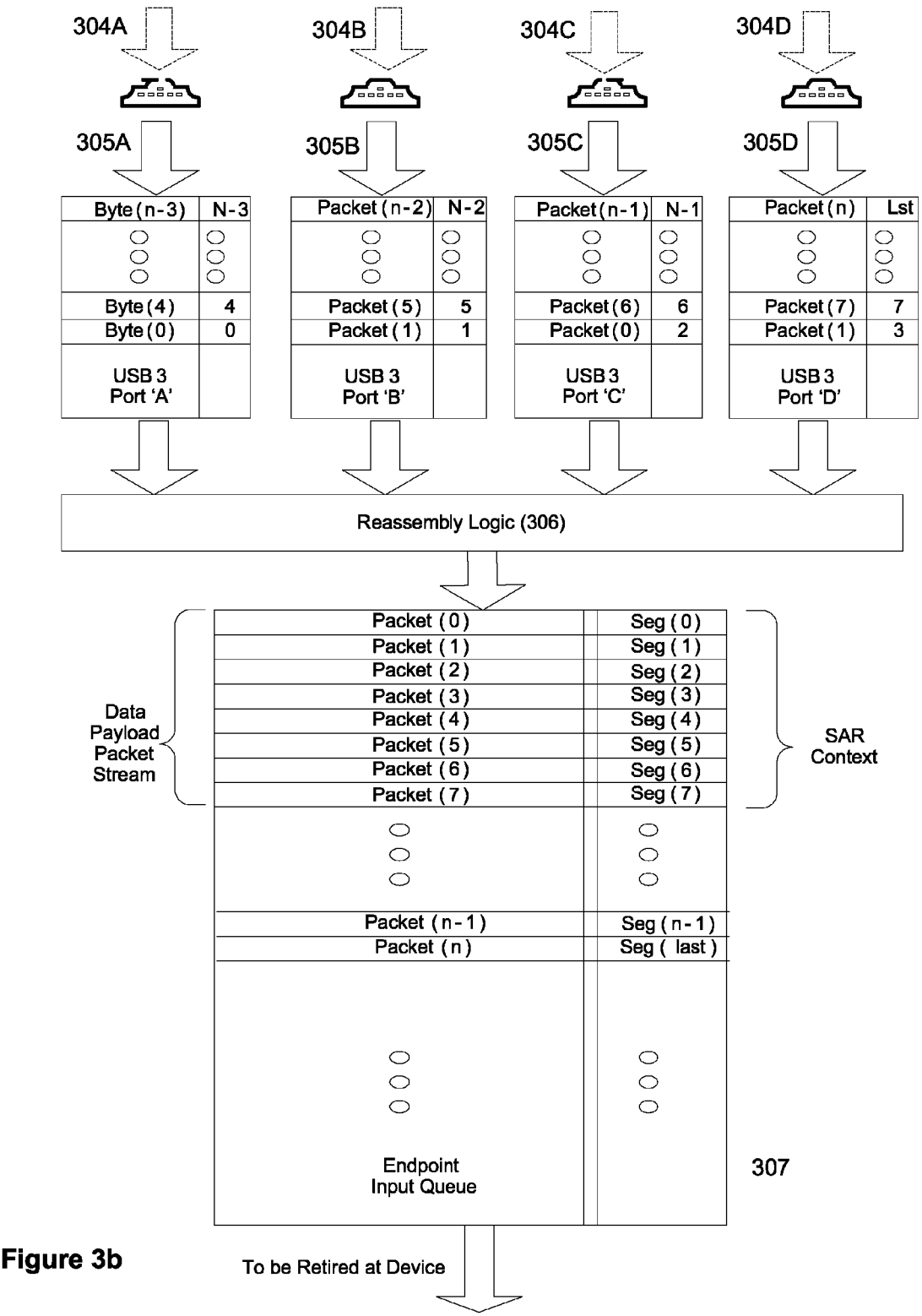

FIGS. 3a and 3b demonstrates some embodiments when more than 2 USB cables are available for increasing bandwidth. Any number (N) of 2 or more USB cables can be used. In some embodiments, thought, $2^N$ cables are used. In other embodiments, such as when payloads of digital data are configured in $2^N$ configurations (where N is an integer), FIGS. 3a and 3b shows striping across $2^N$ channels where N is an integer equal to 2. When N is equal to 1, the configuration found in FIG. 2 can be used and when N is equal to 0, a standardized system not utilizing striping as data is transferred across a single USB cable. And while powers of 2 are convenient to work with in digital systems, some configurations can be deployed over any number of ports including numbers of ports that are not powers of two, e.g., data striping over 3 (or more) ports can be used so long as sequence numbering is maintained. In these configurations, the ports must each have full access to the USB bandwidth to derive the maximum benefit of USB data striping.

Packets of data are queued with their SAR key in the host's output queue 301. In a first in first out basis, the segmentation logic 302 directs the incoming payload into $2^N$ ports 303A-303D (here ports A, B, C and D represent, respectively, the first 2 and last 2 ports of the $2^N$ ports). Moving from FIG. 3a to FIG. 3b, the ports with their corresponding standardized USB bus cable 304A-304D transfers the data to the corresponding destination ports 305A-305D. As seen, this method is scalable and allows a system administrator to address transfer needs according to growth, time efficiency or power concerns. Not indicated is that USB cables can be of varying lengths and there is no guarantee that the data can arrive synchronously to its destination requiring an asynchronous transfer mode segmentation and reassembly key framework as shown with regard to FIG. 2. At this point, the packets of data are reassembled using reassembly logic 306 according to the segmentation and reassembly key attached to each incoming packet and stacked in the destination's input queue 307 before being retired to the destination device (not shown).

Figure 4:
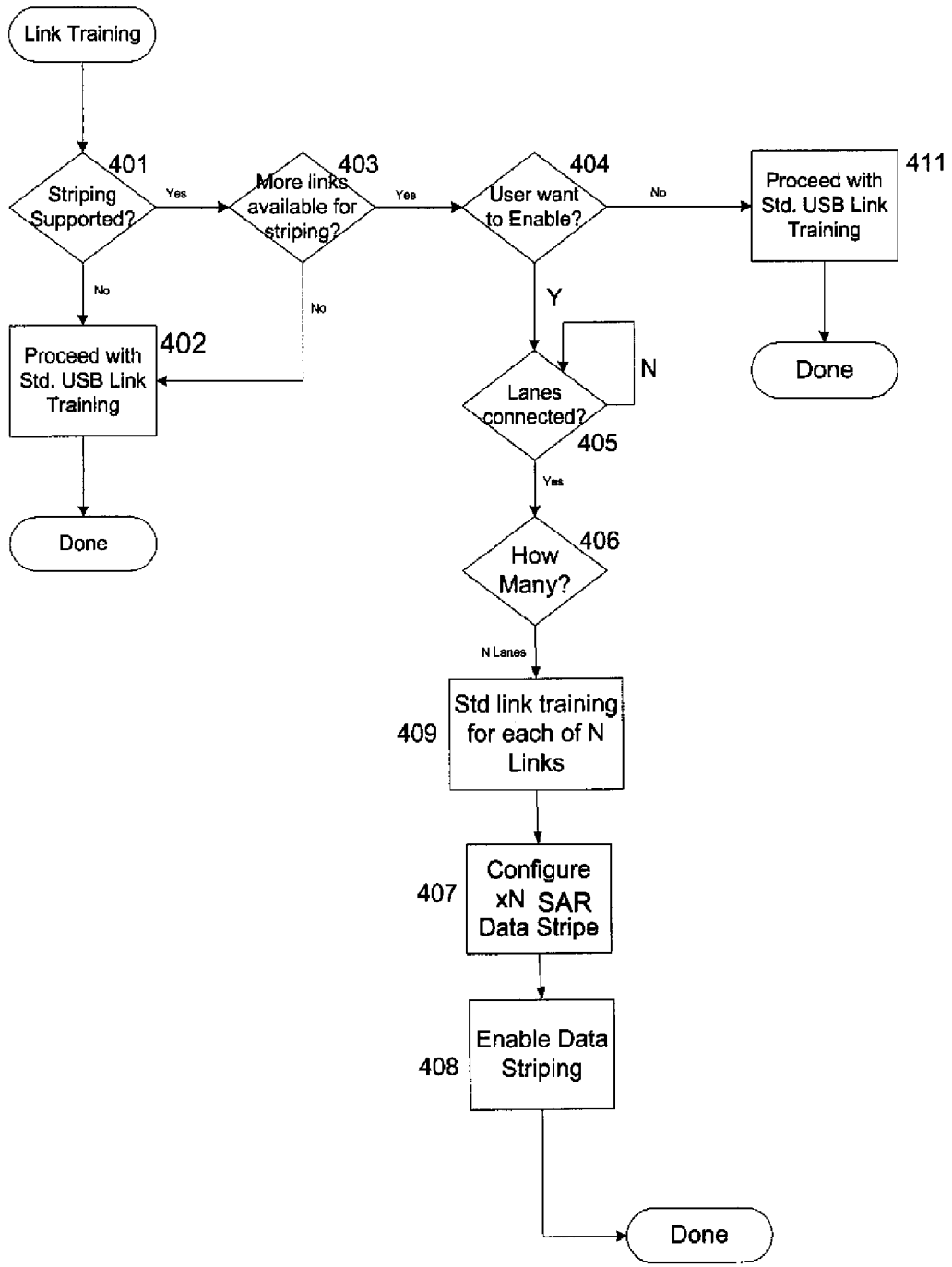
FIG. 4 depicts a flow chart of some embodiments of how two striping enabled USB link partners would train their link for data striping across N lanes, where N is equal to or greater than 2.

FIG. 4 is a flow diagram depicting link training for striping enabled devices that will be able to take advantage of the bandwidth gains offered by striping. The data striping hardware along with the software component possibly built into the BIOS will allow discovery, enumeration and configuration of the two devices end to end SAR capability and bind the USB bus lanes available for striping. First, the source and destination must determine if data striping is supported at both ends of the USB cable 401. If one of the devices does not support striping, the system will simply default to transferring data across as single USB cable in step 402. If both the source and destination are capable of supporting striping the system identifies if more than one port or link is available for data transfer between the devices. If there is only one port available for transfer at either device, the system will again proceed with standard USB link training. In some instances, the devices should be able to take advantage of any number of USB connections available to them. The USB link training is independent even though the training sequences may be used to covey some link specific capabilities.

On the other hand, as depicted in FIG. 4, if both devices support striping and both devices have more than one port available for utilizing the striping mechanism, the user is asked whether data striping is desired. If the answer is no, the striper proceeds to perform standard USB link training 411. In some configurations, since this capability is brought up by the BIOS (prior to presentation of the device's presence to the operating system), this process can be configured to have the user input provided via a BIOS/chipset setup utility. These configurations can be concealed from the user by the host controller and can, for example, tell the user that by using 2 cables, the device will operate faster. In other configurations, this process can be done at the driver level, with or without the user's input.

As shown in FIG. 4, if the answer is yes a wait state 405 is established until the desired number of USB cables are connected between the striping enabled devices. When the user has finished connecting plurality of cable lines, the striper determines the number of striping lanes 406. Next, as shown in box 409, a standard link training occurs for each of the constituent USB links individually.

If two lanes are discovered, the striper configures 2 lanes, establishes the segmentation and reassembly requirements for odd/even data striping 407 and then enables data striping 408. Thus the embodiments depicted in FIG. 4, the number of lanes is based on N rather than a power of 2. Thus, process can be represented in a single path, first checking for "striping enabled" and then counting the number of lanes connected. The single lane case can be mapped on to the same path as the rest when "striping" is enabled. In other embodiments, such as if $2^N$ lanes are discovered rather than just a power of 2, the striper can configure segmentation and reassembly data striping accordingly and enable data striping for $2^N$ lanes.

The present embodiments described above relate to speeding transfers between devices in a USB connected environment. The invention detects when the devices are capable of striping across $2^N$ USB cable connections where N is an integer equal to or greater than 1. The embodiments then stripes or segments the data packets into $2^N$ groups while transferring the data across the $2^N$ standardized USB cables, and reassembles the data stream at the receiving device.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, examples are meant to be illustrative only and should not be construed to be limiting in any manner.

We claim:

1. A striper system, comprising:
    a cable identifier that determines if a source is striper enabled and if a destination is striper enabled and in a case that the source and destination are both striper enabled, determining a number of available Universal Serial Bus (USB) ports available at the source and destination and establishing a wait state until a determined number of physical parallel USB cable lines, including a first USB cable line and a second USB cable line are connected to at least two of the available USB ports at both the source and the destination;
    a segmentator that separates and delivers a payload across the plurality of physical parallel USB cable lines from the striper enabled source to the striper enabled destination; and
    a reassembler that receives and reassembles the payload from the physical plurality of parallel USB cable lines, wherein the payload is simultaneously delivered from the at least two of the available USB ports at the source to the at least two of the available USB ports at the destination via both the first USB cable line and the second USB cable line.

2. The striper system of claim 1, wherein the physical plurality of parallel USB cable lines are USB 3.0 standardized cables.

3. The striper system of claim 1, wherein the physical plurality of parallel USB cable lines is equal to N, where N is an integer greater than or equal to the number 1.

4. The striper system of claim 1, wherein the payload is separated into a plurality of enumerated packets that are interleaved across the physical plurality of parallel USB cable lines in a first in first out basis.

5. The striper system of claim 1, wherein the cable identifier defaults to a single cable line delivery of the payload when it is unable to identify a plurality of available cable lines.

6. The striper system of claim 1, further comprising a user interface for querying a user to designate whether the plurality of cables desired are attached between the striper enabled source and the striper enabled destination.

7. The striper system of claim 6, wherein the user interface queries whether striping is desired.

8. A network system, comprising:
    a cable identifier that determines if a source is striper enabled and if a destination is striper enabled and in a case that the source and destination are both striper enabled, establishing a wait state until a determined number of physical parallel Universal Serial Bus (USB) cable lines, including a first USB cable line and a second USB cable line, are connected to at least two of a determined number of available USB ports at both the source and the destination;
    a segmentator that separates and delivers a payload across the plurality of physical parallel USB cable lines from the striper enabled source to the striper enabled destination; and
    a reassembler that receives and reassembles the payload from the plurality of physical parallel USB cable lines, wherein the payload is simultaneously delivered from the at least two of the available USB ports at the source to the at least two of the available USB ports at the destination via both the first USB cable line and the second USB cable line.

9. The system of claim 8, wherein the plurality of physical parallel USB cable lines are USB 3.0 standardized cables.

10. The system of claim 8, wherein the plurality of physical parallel USB cable lines is equal to N, where N is an integer greater than or equal to the number 1.

11. The system of claim 8, wherein the payload is separated into a plurality of enumerated packets that are interleaved across the plurality of physical parallel USB cable lines in a first in first out basis.

12. The system of claim 8, wherein the cable identifier defaults to a single cable line delivery of the payload when it is unable to identify a plurality of available cable lines.

13. The system of claim 8, further comprising a user interface for querying a user to designate whether the plurality of cables desired are attached between the striper enabled source and the striper enabled destination.

14. The system of claim 8, wherein the user interface queries whether striping is desired.

15. The striper system of claim 1 wherein in a case that the cable identifier determines that either the source or the destination do not support striping, the striper system will transfer data across a single USB cable.

* * * * *